United States Patent
Hessbrueggen

(10) Patent No.: US 8,950,302 B2
(45) Date of Patent: Feb. 10, 2015

(54) SELF-LOADING MACHINING APPARATUS WITH TWO VERTICAL WORKPIECE SPINDLES

(75) Inventor: Norbert Hessbrueggen, Salach (DE)

(73) Assignee: Emag Holding GmbH, Salach (DE)

( * ) Notice: Subject to any disclaimer, the term of this patent is extended or adjusted under 35 U.S.C. 154(b) by 102 days.

(21) Appl. No.: 13/589,373

(22) Filed: Aug. 20, 2012

(65) Prior Publication Data
US 2013/0042732 A1 Feb. 21, 2013

(30) Foreign Application Priority Data
Aug. 16, 2011 (DE) .......................... 10 2011 110 202

(51) Int. Cl.
| | |
|---|---|
| B23B 15/00 | (2006.01) |
| B23Q 3/155 | (2006.01) |
| B23Q 39/02 | (2006.01) |
| B23B 3/30 | (2006.01) |
| B23Q 39/00 | (2006.01) |

(52) U.S. Cl.
CPC .............. *B23B 3/30* (2013.01); *B23Q 3/15506* (2013.01); *B23Q 39/028* (2013.01); *B23Q 2039/008* (2013.01); *Y10S 82/901* (2013.01)
USPC ..................... 82/122; 82/125; 82/129; 82/901

(58) Field of Classification Search
USPC ............................. 82/122, 124, 125, 129, 901
See application file for complete search history.

(56) References Cited

U.S. PATENT DOCUMENTS

| | | | | |
|---|---|---|---|---|
| 3,765,278 A | * | 10/1973 | Fisher .............................. | 82/124 |
| 4,742,739 A | * | 5/1988 | Yamaguchi et al. ............. | 82/122 |
| 5,081,889 A | * | 1/1992 | Takano et al. .................... | 82/122 |
| 5,704,262 A | * | 1/1998 | Baumbusch et al. ............ | 82/124 |
| 6,021,695 A | * | 2/2000 | Kosho et al. ..................... | 82/122 |
| 7,013,544 B2 | * | 3/2006 | Yasuda et al. ................. | 29/27 C |
| 8,136,214 B2 | * | 3/2012 | Hessbruggen ................ | 29/27 C |
| 8,661,950 B2 | * | 3/2014 | Hessbrueggen et al. ........ | 82/1.11 |
| 2013/0042732 A1 | * | 2/2013 | Hessbrueggen ................ | 82/121 |

* cited by examiner

*Primary Examiner* — Will Fridie, Jr.
(74) *Attorney, Agent, or Firm* — Andrew Wilford

(57) ABSTRACT

A machining apparatus has a frame having an upright front wall and two vertical guides on the front wall carrying respective spindle units displaceable on the guides and each having a workpiece holder rotatable about a respective vertical axis and vertically shiftable between a respective upper machining station and a respective lower pick-up/drop-off station. A horizontal guide on the front wall carries a tool turret carrying a tool and shiftable along the horizontal guide between one position aligned with the axis of one of the spindles and another position aligned with the axis of the other of the spindles. A conveyor transports unmachined workpieces into the lower stations and machined workpieces out of the lower stations. Respective actuators shift the spindle units vertically along the respective axis between the lower stations and the upper stations.

5 Claims, 1 Drawing Sheet

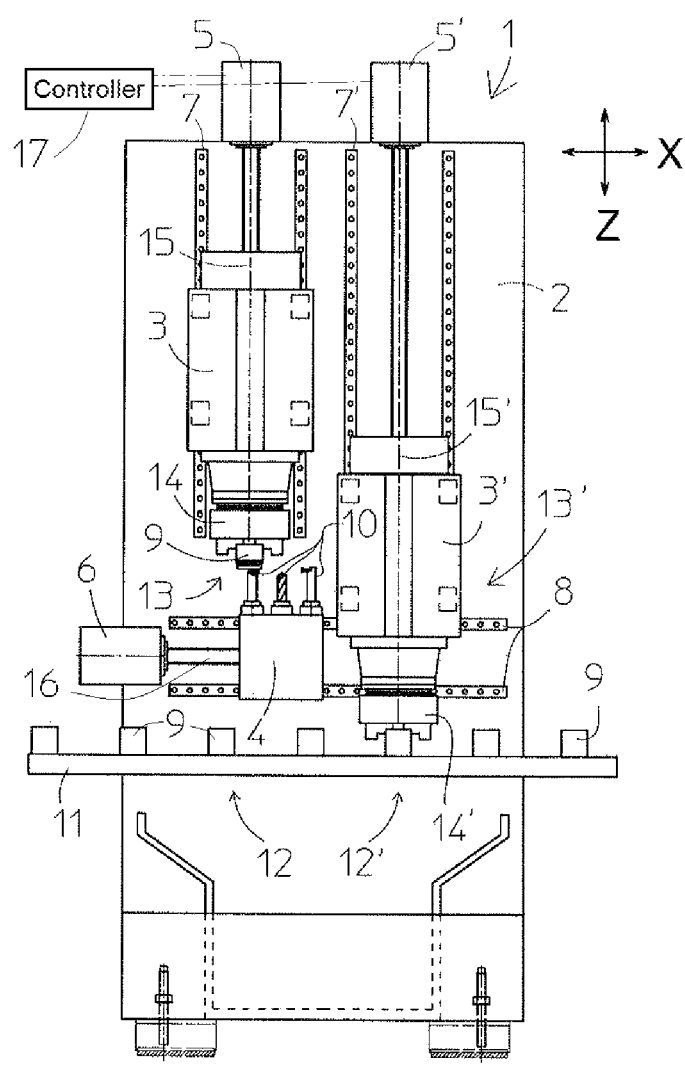

SELF-LOADING MACHINING APPARATUS WITH TWO VERTICAL WORKPIECE SPINDLES

FIELD OF THE INVENTION

The present invention relates to a machining apparatus. More particularly this invention concerns such an apparatus with two vertical workpiece spindles.

BACKGROUND OF THE INVENTION

As disclosed in US 2012/0048075 a machining apparatus has a frame and two generally parallel horizontal guides on the frame, one of which extends through at least one loading station and through at least one work station. A slide carrying a pair of spindles each capable of gripping a workpiece is shiftable between positions with the spindles aligned with the stations. A tool holder is shiftable on the other of the guides toward and away from the work station. Respective guides between each of the spindles and the slide allow vertical movement of the spindles on the slide. Actuators shift the slide horizontally on the one guide, shift the tool holder horizontally parallel to the slide on the other guide, and shift the spindles vertically on the slide.

While one workpiece is machined in the first spindle, a completely machined workpiece can be replaced by an unmachined one in the second spindle. Both workpiece spindles can be moved together horizontally on the machine frame so as to be loaded alternately. The advancing motions are effected by vertically moving the workpiece spindles, and the tool turret is moved horizontally during the infeed action.

OBJECTS OF THE INVENTION

It is therefore an object of the present invention to provide an improved self-loading machining apparatus with two vertical workpiece spindles.

Another object is the provision of such an improved dual-spindle machining apparatus that overcomes the above-given disadvantages, in particular where the travel paths in lathes of this type are shortened to shorten the idle times in which workpieces are not being machined.

SUMMARY OF THE INVENTION

A machining apparatus has according to the invention a frame having an upright front wall and two horizontally spaced vertical guides on the front wall carrying respective spindle units vertically displaceable on the guides and each having a workpiece holder rotatable about a respective vertical axis and axially vertically shiftable between a respective upper machining station and a respective lower pick-up/drop-off station axially therebelow. A horizontal guide on the front wall carries a tool turret carrying at least one tool and shiftable along the horizontal guide between one position aligned with the axis of one of the spindles and another position aligned with the axis of the other of the spindles. A conveyor transports unmachined workpieces into the lower stations and machined workpieces out of the lower stations. Respective actuators shift the spindle units vertically along the respective axis between the lower stations for picking up unmachined workpieces and dropping off machined workpieces and the upper stations for rotation of the workpieces in engagement with the tool of the tool holder.

In one advantageous aspect of the invention, both workpiece spindles are disposed directly adjacent to one another.

As a result, the travel path for the tool carriers from one workpiece spindle to the other is especially short. This provides an extremely short chip-to-chip time. In addition, a conveyor belt transports the workpieces into loading positions directly below the working positions. Loading and unloading is then effected by moving the workpiece spindles vertically. This also occurs very quickly, thereby making loading and unloading possible during the idle time even when there are low cycle times.

BRIEF DESCRIPTION OF THE DRAWING

The above and other objects, features, and advantages will become more readily apparent from the following description, reference being made to the accompanying drawing the sole FIGURE of which is a partly schematic side elevational view of the apparatus according to the invention.

DETAILED DESCRIPTION

As seen in the drawing the dual-spindle lathe or turning machine according to the invention has a frame with a front wall on which two so-called spindle/drive units 3 and 3' are vertically shiftable in a direction Z on respective vertical guides 7 and 7' by respective drive motors or actuators 5 and 5'. Each spindle 3 and 3' has a respective workpiece holder or chuck 14 or 14' rotatable about a respective vertical axis 15 or 15' by its respective normally electric motor. The actuators 5 and 5' can shift the respective chucks 14 and 14' between respective upper working positions 13 and 13' and lower pick-up/drop-off positions 12 and 12'.

The front wall 2 also carries between the positions 13, 13' and 12, 12' a horizontal guide 8 on which a tool turret 4 is shiftable horizontally by a ball spindle 16 from a motor 6, like the spindle units 3 and 3'. This turret 4 carries a plurality of different tools 10, here including a drill bit and two cutting/milling tools, although grinding and other tools are possible. A controller 17 is connected to the actuator 5, 5', and 6 and also operates the conveyor 11.

Underneath the positions 12 and 12' and the guide 7 is a horizontal conveyor 11 that transport workpieces 7 to be machined into the positions 12 and 12' and transports machined workpieces out of the positions 12 and 12'.

With this system when one of the spindles 3 or 3' is rotating an unmachined workpiece 9 in the respective upper work station 13 or 13', the other spindle 3 or 3' can be dropping off a machined workpiece 9 and then picking up an unmachined workpiece 9 from the station 12 or 12'. Thus while one spindle 3 or 3' is rotating a workpiece 9 in contact with one of the tools 10, the other spindle 3 or 3' is loading or unloading. Everything takes place in front of the planar front wall 2 of the frame 1 so that servicing and monitoring the job is easy, and the system takes up little floor space.

I claim:

1. A machining apparatus comprising:
   a frame having an upright and planar front wall and a pair of side walls;
   two horizontally spaced vertical guides entirely on the front wall;
   respective closely juxtaposed spindle units vertically displaceable on the guides in front of the front wall and each having a workpiece holder rotatable about a respective vertical axis and axially vertically shiftable between a respective upper machining station and a respective lower pick-up/drop-off station axially therebelow, the vertical axes defining a vertical plane parallel to and in front of the front wall;

a horizontal guide on the front wall below the vertical guides and parallel to the plane;

a tool turret carrying at least one tool and shiftable along the horizontal guide in front of the front wall between one position aligned with the axis of one of the spindles and another position aligned with the axis of the other of the spindles;

a conveyor for transporting unmachined workpieces parallel to the plane into the lower stations and for transporting machined workpieces parallel to the plane out of the lower stations; and respective actuators for shifting the spindle units vertically along the respective axis between the lower stations for picking up unmachined workpieces and dropping off machined workpieces and the upper stations for rotation of the workpieces in engagement with the tool of the tool holder.

2. The machining apparatus defined in claim 1, wherein the conveyor transports the workpieces in a transport direction into the lower stations and in the same transport direction out of the lower stations.

3. The machining apparatus defined in claim 1, further comprising:

control means for alternately operating the actuators such that, while an unmachined workpiece is being machined by being rotated in one of the upper stations while in contact with the tool of one of the spindles, the other spindle is unloading a machined workpiece in the lower station and picking up an unmachined workpiece in the lower station.

4. The machining apparatus defined in claim 1, wherein the horizontal guide is below the upper work stations.

5. The machining apparatus defined in claim 4, wherein the horizontal guide is immediately above the conveyor.

\* \* \* \* \*